(12) United States Patent
Chen

(10) Patent No.: US 10,214,221 B2
(45) Date of Patent: Feb. 26, 2019

(54) SYSTEM AND METHOD FOR IDENTIFYING A VEHICLE DRIVER BY A PATTERN OF MOVEMENT

(71) Applicant: Honda Motor Co., Ltd., Tokyo (JP)

(72) Inventor: Bonnie Hu Chen, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/410,877

(22) Filed: Jan. 20, 2017

(65) Prior Publication Data
US 2018/0208204 A1    Jul. 26, 2018

(51) Int. Cl.
| | |
|---|---|
| *G06F 15/18* | (2006.01) |
| *B60W 40/09* | (2012.01) |
| *G06F 1/16* | (2006.01) |
| *G06N 5/04* | (2006.01) |
| *G06N 99/00* | (2010.01) |
| *B60W 40/08* | (2012.01) |

(52) U.S. Cl.
CPC ............ *B60W 40/09* (2013.01); *G06F 1/163* (2013.01); *G06F 1/1694* (2013.01); *G06N 5/047* (2013.01); *G06N 99/005* (2013.01); *B60W 2040/0809* (2013.01); *B60W 2540/28* (2013.01); *B60W 2710/18* (2013.01); *B60W 2710/20* (2013.01); *B60W 2710/30* (2013.01)

(58) Field of Classification Search
CPC .. G06N 5/047; B60W 40/09; B60W 2540/28; B60W 2040/0809; B65H 2511/412; B65H 2511/50; B65H 2511/51; B65H 2511/52; B65H 2511/40; B65H 75/182; B60L 2250/20; B60L 2250/22; B60L 2250/30; A61B 5/117; B65F 2210/138

USPC .......................................... 706/12, 905, 913
See application file for complete search history.

(56) References Cited

U.S. PATENT DOCUMENTS

| | | |
|---|---|---|
| 8,516,561 B2 | 8/2013 | White et al. |
| 8,525,668 B1 | 9/2013 | Alouani et al. |
| 8,693,726 B2 | 4/2014 | Karakotsios et al. |
| 8,706,349 B2 | 4/2014 | Rector et al. |
| 8,810,430 B2 | 8/2014 | Proud |
| 8,825,222 B2 | 9/2014 | Namburu et al. |
| 8,954,340 B2 | 2/2015 | Sanchez et al. |
| 9,008,641 B2 | 4/2015 | Yang et al. |

(Continued)

OTHER PUBLICATIONS

Office Action of U.S. Appl. No. 15/475,221 dated Jan. 5, 2018, 25 pages.

(Continued)

*Primary Examiner* — Hsien Ming Lee
(74) *Attorney, Agent, or Firm* — Rankin, Hill & Clark LLP

(57) ABSTRACT

A computer-implemented method and system for identifying a vehicle driver by a pattern of movement that includes receiving at least one sensor signal from at least one wearable device. The method and system additionally include determining the pattern of movement based on data extracted from the at least one sensor signal and determining if the pattern of movement is consistent with at least one driver movement pattern. The method and system further include identifying the vehicle driver based on the pattern of movement being consistent with the at least one driver movement pattern. The method and system also include controlling at least one vehicle system by executing vehicle settings associated with the identified vehicle driver.

20 Claims, 6 Drawing Sheets

(56) References Cited

U.S. PATENT DOCUMENTS

| | | |
|---|---|---|
| 9,037,125 B1 | 5/2015 | Kadous |
| 9,387,824 B2 | 7/2016 | Pisz et al. |
| 9,467,817 B1 | 10/2016 | Van Wiemeersch |
| 2008/0244699 A1 | 10/2008 | Parhofer et al. |
| 2014/0007225 A1 | 1/2014 | Gay et al. |
| 2014/0085050 A1 | 3/2014 | Luna |
| 2014/0089673 A1 | 3/2014 | Luna |
| 2014/0278586 A1 | 9/2014 | Sanchez et al. |
| 2015/0081169 A1 | 3/2015 | Pisz |
| 2015/0131857 A1 | 5/2015 | Han et al. |
| 2015/0148989 A1 | 5/2015 | Cooper et al. |
| 2015/0288687 A1 | 10/2015 | Heshmati et al. |
| 2015/0365979 A1 | 12/2015 | Park |
| 2016/0039429 A1 | 2/2016 | Abou-nasr et al. |
| 2016/0226865 A1* | 8/2016 | Chen ............... G06F 21/31 |
| 2017/0240066 A1* | 8/2017 | Wang ............... B60N 2/002 |

OTHER PUBLICATIONS

Office Action of U.S. Appl. No. 15/475,221 dated Apr. 12, 2018, 28 pages.
Office Action of U.S. Appl. No. 15/475,221 dated Aug. 7, 2018, 20 pages.

* cited by examiner

SYSTEM AND METHOD FOR IDENTIFYING A VEHICLE DRIVER BY A PATTERN OF MOVEMENT

BACKGROUND

Currently, vehicles may be driven by numerous individuals in addition to a vehicle owner. For example, a vehicle may be utilized by numerous drivers within a household in addition to the vehicle owner. Each individual may modify a number of settings in the vehicle to be in accordance with his or her preferences. In some cases, vehicle settings may be modified for each individual based on a set of input buttons labeled with numbers (e.g., Input 1, Input 2, Input 3) that may be set to be programmed to memorize certain vehicle settings. Such memorized vehicle settings may pertain to customized positioning of certain vehicle components such as seats, mirrors, steering wheel, etc. for a number of individuals that correspond to the number of input buttons. Therefore, these input buttons may limit settings for a small number of individuals. Consequently, individuals additional to the number of individuals that have fully utilized the input buttons to memorize their preferred vehicle settings may not be able to save their preferred vehicle settings unless they overwrite one of the other individual's saved preferred vehicle settings corresponding to the input buttons.

Additionally, utilizing the set of input buttons to initiate the individual's preferred settings may have some drawbacks with respect to an amount of time it may take for the settings to be executed prior to the individual driving the vehicle. For example, in many cases individuals may select their respective input button only after approaching or entering the vehicle for the vehicle settings to be adjusted based on the preferred vehicle settings. In many cases, the respective input buttons work if the vehicle is not fully enabled (e.g., engine is not turned on) or if the vehicle is within a park transmission gear. Therefore, in many cases the individuals have to wait for a period of time for the vehicle settings to be adjusted based on their preferred vehicle settings before enabling and/or driving the vehicle.

BRIEF DESCRIPTION

According to one aspect, a computer-implemented method for identifying a vehicle driver by a pattern of movement that includes receiving at least one sensor signal from at least one wearable device. The computer-implemented method additionally includes determining the pattern of movement based on data extracted from the at least one sensor signal and determining if the pattern of movement is consistent with at least one driver movement pattern. The at least one driver movement pattern includes a sequence of actions that are related to at least one of: approaching the vehicle, opening a door of the vehicle, entering the vehicle, and utilizing the vehicle. The computer-implemented method also includes identifying the vehicle driver based on the pattern of movement being consistent with the at least one driver movement pattern. The computer-implemented method further includes controlling at least one vehicle system by executing vehicle settings associated with the identified vehicle driver.

According to another aspect, a system for identifying a vehicle driver by a pattern of movement that includes a memory storing instructions when executed by a processor cause the processor to receive at least one sensor signal from at least one wearable device. The instructions also cause the processor to determine the pattern of movement based on data extracted from the at least one sensor signal and determine if the pattern of movement is consistent with at least one driver movement pattern. The at least one driver movement pattern includes a sequence of actions that are related to at least one of: approaching the vehicle, opening a door of the vehicle, entering the vehicle, and utilizing the vehicle. The instructions additionally cause the processor to identify the vehicle driver based on the pattern of movement being consistent with the at least one driver movement pattern. The instructions further cause the processor to control at least one vehicle system by executing vehicle settings associated with the identified vehicle driver.

According to still another aspect, a computer readable storage medium storing instructions that when executed by a computer, which includes at least a processor, causes the computer to perform a method that includes receiving at least one sensor signal from at least one wearable device. The instructions also include determining a pattern of movement based on data extracted from the at least one sensor signal and determining if the pattern of movement is consistent with at least one driver movement pattern. The at least one driver movement pattern includes a sequence of actions that are related to at least one of: approaching a vehicle, opening a door of the vehicle, entering the vehicle, and utilizing the vehicle. The instructions additionally include identifying the vehicle driver based on the pattern of movement being consistent with the at least one driver movement pattern. The instructions further include controlling at least one vehicle system by executing vehicle settings associated with the identified vehicle driver.

DETAILED DESCRIPTION

Figure 1:
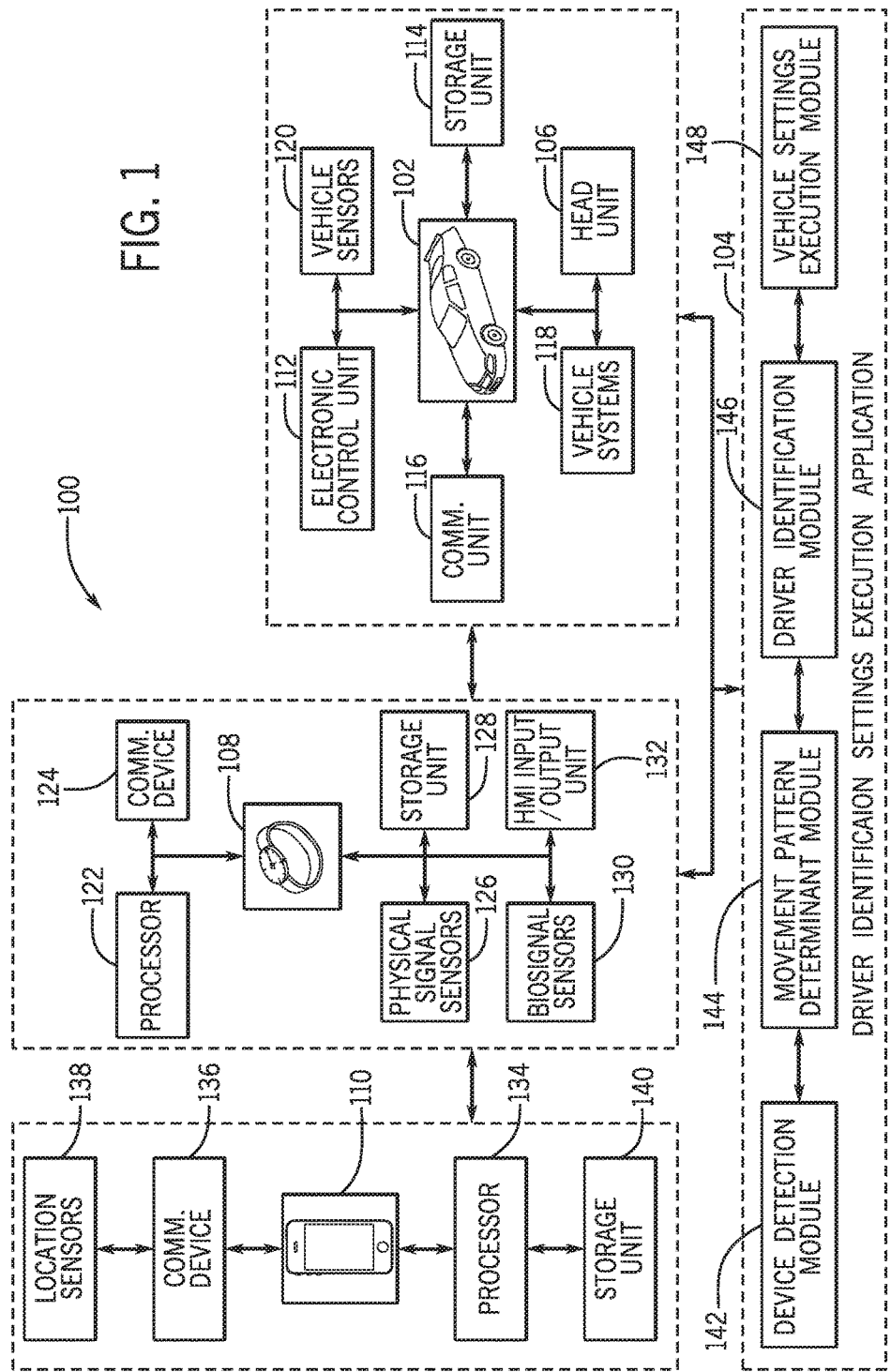
FIG. 1 is a schematic view of an operating environment for implementing systems and methods for identifying a vehicle driver by a pattern of movement, according to an exemplary embodiment.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database", as used herein may refer to table, a set of tables, a set of data stores and/or methods for accessing and/or manipulating those data stores. Some databases may be incorporated with a disk as defined above.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle system", as used herein may include, but is not limited to, any automatic or manual systems that may be used to enhance the vehicle, driving and/or safety. Exemplary vehicle systems include, but are not limited to: a vehicle HVAC system, a vehicle infotainment system, a vehicle engine control system, a vehicle GPS/navigation system, a vehicle seat position settings system, vehicle steering/mirror position setting system, a vehicle driver customization settings system, a vehicle transmission control system, vehicle safety control systems, vehicle stability control systems, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a brake pedal system, an electronic power steering system, a proximity sensor systems, and an electronic pretensioning system, among others.

A "vehicle sensors", as used herein may include, but is not limited to, electric current/potential (e.g., proximity sensors, inductive, capacitive), ultrasonic (e.g., piezoelectric, electrostatic), vibration, optical, vision, photoelectric or oxygen sensors, among others.

A "wearable computing device", as used herein may include, but is not limited to, a computing device component (e.g., a processor) with circuitry that may be worn by and/or in possession of a user. In other words, a wearable computing device is a computer that is subsumed into the personal space of a user. Wearable computing devices may include a display and may include various sensors for sensing and determining various parameters associated with a user. For example, location, motion, and biosignal (physiological) parameters, among others. Some wearable computing devices have user input and output functionality. Exemplary wearable computing devices may include, but are not limited to, watches, glasses, clothing, gloves, hats, shirts, jewelry, rings, earrings necklaces, armbands, shoes, earbuds, headphones and personal wellness devices.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an operating environment 100 for implementing systems and methods for identifying a vehicle driver by a pattern of movement, according to an exemplary embodiment. The components of the environment 100, as well as the components of other systems, hardware architectures, and software architectures discussed herein, may be combined, omitted, or organized into different architectures for various embodiments.

Generally, the environment 100 includes a vehicle 102 that includes a plurality of components that execute a vehicle driver identification and settings execution application (driver ID settings application) 104. As described in more detail below, the driver ID settings application 104 may be executed on a head unit 106 of the vehicle 102, one or more wearable computing devices (wearable device) 108 that may communicate with the vehicle 102, or one or more portable electronic devices (portable device) 110 that may communicate with the wearable device 108 and/or the vehicle 102, or any combination of the foregoing. In some embodiments, the driver ID settings application 104 may be executed on an externally hosted computing infrastructure (not shown) that is accessed by the head unit 106, the wearable device(s) 108 and/or the portable device(s) 110.

In one or more embodiments, the wearable device(s) 108 may include a device that is physically associated to the individual(s) and may be configured to be worn to sense physical movement parameters and biosignal biometric parameters pertaining to the individual(s). The wearable device(s) 108 may include, but is not to be limited to, a virtual headset, a watch, a pair of glasses, a bracelet, an anklet, a ring, a pedometer, an arm band, a holster, and headwear, among other types of wearables. One or more individuals, that may include the vehicle owner and/or approved drivers of the vehicle 102 (setup as such by the vehicle owner utilizing the application 104, as discussed in more detail below), may wear the respective wearable device(s) 108.

As discussed in more detail below, in one embodiment, the driver ID settings application 104 may be executed to identify a potential vehicle driver (not shown) (hereinafter referred to as vehicle driver) from one or more individuals wearing one or more wearable devices 108 based on a pattern of movement of one or more of the individuals that is determined based on physical movement captured and physical movement sensor signals representing the physical movement parameters and/or biometric signals representing the biosignal biometric parameters to the biosignal biometric parameters received from the wearable device(s) 108. In one or more embodiments, the pattern of movement of the one or more individuals may include a movement, a gesture, a sequence of actions, and/or a sequence of gestures that are determined from data extracted from sensors of the wearable device(s) 108 and converted into a data package to identify the vehicle driver based on a comparison with one or more stored traditional patterns of movement of vehicle drivers (hereinafter referred to as driver movement patterns).

In particular, the driver ID settings application 104 may determine if the pattern of movement of one or more of the individuals wearing the wearable device(s) 108 are consistent with at least one of the one or more driver movement patterns. For example, the driver ID settings application 104 may identify the vehicle driver based on an individual's pattern of movement which is consistent with driver movement patterns associated with inputting a garage door open button (not shown), pulling of a vehicle door handle (not shown), opening of a vehicle door (not shown) and entering the vehicle 102. Upon identifying the vehicle driver, the driver ID settings application 104 may execute one or more preprogrammed vehicle settings that are associated with the identified vehicle driver.

In the illustrated embodiment of FIG. 1, the vehicle 102 may include an electronic control unit (ECU) 112 with provisions for processing, communicating and interacting with various components of the vehicle 102 and other components of the environment 100. In one embodiment, the ECU 112 may be operably connected to the head unit 106, a storage unit 114, a communication unit 116, a plurality of vehicle systems 118, and/or a plurality of vehicle sensors 120. However, it is to be appreciated that the ECU 112 may be operably connected to numerous additional vehicle components and devices not included within the exemplary environment 100 illustrated in FIG. 1.

Generally, the ECU 112 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 112 and other components, networks, and data sources, of the environment 100. The ECU 112 may receive one or more command signals from the driver ID settings application 104 to operably control one or more of the plurality of vehicle systems 118 in accordance with a vehicle settings profile (not shown) that is associated to an individual that may include the vehicle owner or an approved driver of the vehicle 102 that is identified as the vehicle driver.

In some cases the ECU 112 may receive one or more command signals from the driver ID settings application 104 to operably control one or more of the plurality of vehicle systems 118 in accordance with a default vehicle settings profile that is utilized when an undisclosed driver is identified as the vehicle driver. In other words, as discussed below, when the driver ID settings application 104 determines that the identified vehicle driver is not the vehicle owner and/or one of the one or more approved drivers of the vehicle 102, the application may identify the vehicle driver as the undisclosed driver and may apply the default vehicle settings profile to control one or more of the plurality of vehicle systems 118 to provide default settings to the identified vehicle driver.

As discussed, the ECU 112 is also operably connected for computer communication (e.g., via the bus and/or the I/O interface) to the head unit 106. The head unit 106 may be connected to one or more display devices (not shown) (e.g., display screens), audio devices (not shown), and haptic devices (not shown) (e.g., haptic steering wheel) that are utilized to provide a human machine interface (not shown). As discussed below, the one or more display devices may be operated to display one or more user interfaces associated with the driver ID settings application 104 that may be utilized by the vehicle owner to add profiles of himself/herself and of one or more approved drivers of the vehicle 102. Additionally, the user interface(s) may be utilized by the vehicle owner or the approved driver(s) of the vehicle 102 to create a respective vehicle settings profile, link wearable device(s) 108 and portable devices(s) 110 that are worn by/possessed by and associated with the vehicle owner or the approved driver(s) of the vehicle 102, and/or create a learned driver movement pattern to be utilized by the driver ID settings application 104 to identify the vehicle driver as the vehicle owner or one of the one or more approved drivers of the vehicle 102.

In one embodiment, the head unit 106 may be operably connected to the storage unit 114. In alternate embodiments, the storage unit 114 may be included as a component of the head unit 106. The storage unit 114 may store one or more operating systems, associated operating system data, applications, associated application data, vehicle system and subsystem user interface/application data, and the like that are executed by the ECU 112 and/or the head unit 106 of the vehicle 102. As will be discussed in more detail below, the storage unit 114 may be used by the driver ID settings application 104 to store one or more vehicle settings profiles, a list of one or more wearable devices 108, a list of one or more portable devices 110, and one or more types of driver movement patterns.

In an exemplary embodiment, the ECU 112 and/or the head unit 106 may also be operably connected to the communication unit 116. The communication unit 116 may communicate with one or more components of the operating environment 100 and/or additional systems and components outside of the operating environment 100. The communication unit 116 may include, but is not limited to, one or more transmitters (not shown), one or more antennas (not shown), and additional components (not shown) that may be utilized for wired and wireless computer connections and communications via various protocols, as discussed above. For example, the communication unit 116 may use a dedicated short range communication protocol (DSRC), a Bluetooth™ connection, a Wi-Fi connection, and the like to detect the presence of wearable device(s) 108 and/or portable device(s) 110 within a connectable range (e.g., predetermined vicinity of 100 yards) of the vehicle 102.

As described below, the driver ID settings application 104 may utilize the communication unit 116 to communicate with the wearable device(s) 108 that is located within a predetermined area of the vehicle 102 that may include a connectable range of the vehicle 102 to obtain physical movement sensor signals that are utilized to identify the driver. The driver ID settings application 104 may send one or more command signals to the communication unit 116 to formally connect (e.g., via Bluetooth™ connection) with at least one wearable device 108 and/or one portable device 110 that is worn/possessed and associated by the identified vehicle driver. Additionally, the driver ID settings application 104 may utilize the communication unit 116 to formally block connections between one or more wearable devices 108 and/or portable devices 110 that are deemed not to be worn/possessed and associated with the identified vehicle driver.

As discussed, the ECU 112 may operably control the plurality of vehicle systems 118 that may include the exemplary vehicle systems discussed above (not individually shown) based on command signal(s) received from the driver ID settings application 104. In one or more embodiments, the ECU 112 may also operably control the plurality of vehicle sensors 120 that may include the exemplary vehicle sensors discussed above (not individually shown) that are operable to sense a measurement of data associated with the driver of the vehicle 102, the vehicle 102, a vehicle environment, the plurality of vehicle systems 118, and/or one or more occupants of the vehicle 102, and the like.

In one embodiment, the plurality of vehicle sensors 120 may include one or more cameras (not shown) that are positioned at various locations within and/or outside of the vehicle 102. The one or more cameras may capture images within and/or outside of the vehicle 102 including images of a specific driver of the vehicle 102. Additionally, the plurality of vehicle sensors 120 may include door handle sensors, seat sensors, steering wheel sensors, gear shifter sensors, external proximity sensors, and the like. In an exemplary embodiment, the plurality of vehicle sensors 120 may output one or more data signals indicating one or more measurements of data to the ECU 112 and/or the head unit 106 to be utilized by the driver ID settings application 104 to assist in identifying the vehicle driver when the pattern of movement of more than one individual wearing the wearable device(s) 108 are consistent with driver movement patterns.

With reference to the wearable device(s) 108, in an exemplary embodiment, the wearable device(s) 108 may include a processor 122 with circuitry for processing and controlling components of the wearable device(s) 108. The wearable device(s) 108 may additionally include a communication device 124 that may communicate with one or more components of the operating environment 100 and/or additional systems and components outside of the operating environment 100. The communication device 124 of the wearable device(s) 108 may include, but is not limited to, one or more transceivers (not shown), one or more receivers (not shown), one or more transmitters (not shown), one or more antennas (not shown), and additional components (not shown) that may be used for wired and wireless computer connections and communications via various protocols, as discussed in detail above.

In one embodiment, the communication device 124 may transmit one or more polling signals that may be in a DSRC, Bluetooth™, WI-FI, etc. form that is directed to the communication unit 116 of the vehicle 102 to indicate to the vehicle 102 that the wearable device(s) 108 is located within the connectable range. More specifically, the communication device 124 may emit the polling signal(s) that may be received by the communication unit 116 of the vehicle 102 that may indicate to the ECU 112, the head unit 106, and/or one or more applications including the driver ID settings application 104 that the wearable device(s) 108 is located within the connectable range of the vehicle 102. As discussed below, the driver ID settings application 104 may allow or disallow formal connection(s) of the wearable device(s) 108 based on the identification of the vehicle driver.

In an exemplary embodiment, the polling signal(s) may include a device identification (device ID) of the respective wearable device(s) 108. The device ID may be a unique identifier that is associated with the respective wearable device(s) 108 and may be communicated to the driver ID settings application 104 to detect the respective wearable device(s) 108. As discussed below, the driver ID settings application 104 may evaluate the device ID to determine if the respective wearable device(s) 108 is associated with the vehicle owner or the approved driver(s) of the vehicle 102. In one embodiment, the device ID may include a unique identification code that is assigned by the driver ID settings application 104 that identifies the individual(s) who is wearing the respective wearable device(s) 108. In another embodiment, the device ID may include the serial number corresponding to the respective wearable device(s) 108.

In an exemplary embodiment, when the wearable device(s) 108 is worn, the wearable device(s) 108 may collect one or more physical movement parameters associated with the respective individual(s) wearing the wearable device(s) 108 based on data collected by physical signal sensors 126 of the wearable device(s) 108. The physical signal sensors 126 may include, but are not limited to, an accelerometer, a magnetometer, a gyroscope, an ambient light sensor, a proximity sensor, a locational sensor (e.g., GPS), a positional sensor, a directional sensor (e.g., compass), and the like. Additionally, the physical signal sensors 126 may include one or more cameras that may be accessed by the one or more applications executed and/or accessed on the wearable device(s) 108.

In an exemplary embodiment, the physical signal sensors 126 may provide the one or more physical movement sensor signals that are representative of movement of the individual(s) wearing the respective wearable device(s) 108. In one or more embodiments, the physical movement sensor signal(s) may be representative of one or more movements conducted that may constitute as actions when multiple movements are conducted or gestures provided by the individual(s) wearing the wearable device(s) 108 as captured by the physical signal sensors 126 during a period of time. For example, the physical movement sensor signal(s) may be representative of actions sensed of the individual's arm or gestures sensed of the individual's hand as the individual reaches his/her arm toward the door handle of the vehicle door and grips his/her hand to pull the door handle. In another example, the physical signal sensors 126 may capture walking movements and/or a gait of the individual as he/she is walking and may provide the one or more physical movement sensor signals that represent such actions.

As discussed in more detail below, the driver ID settings application 104 may receive the physical movement sensor signal(s) as communicated by the physical signal sensors 126 to determine the pattern of movement associated with the individual(s) wearing the respective wearable device(s) 108. In one embodiment, the driver ID settings application 104 may receive and store the physical movement sensor signal(s) for a requisite period of time that is utilized determine a shorter or longer pattern of movement that is required to clearly identify the vehicle driver. In other words, the driver ID settings application 104 may evaluate the physical movement sensor signals(s) for movement conducted by the individual(s) for a variable period of time that is required to determine if the pattern of movement is consistent with one or more driver movement patterns to identify the vehicle driver.

In one or more embodiments, the wearable device(s) 108 may additionally include a storage unit 128 that may store one or more operating systems, applications, associated operating system data, application data, and the like that are executed by the processor 122. For example, the storage unit 128 may store application data files associated with the driver ID settings application 104 that may be executed by the processor 122. In an exemplary embodiment, the storage unit 128 may store the device ID that is associated with each of the one or more wearable devices 108 that may be accessed by the communication device 124 to include the device ID within the polling signals transmitted to the vehicle 102.

In some embodiments, the storage unit 128 may be utilized by the driver ID settings application 104 to store data extracted from the physical movement sensor signal(s) to be stored for a predetermined period of time. In some instances, the driver ID settings application 104 may utilize the stored extracted data based on the evaluation of the physical movement sensor signals(s) for movements conducted for the variable period of time, as discussed above.

As discussed below, the driver ID settings application 104 may access the storage unit 128 to retrieve data extracted from the physical movement sensor signal(s) from a prior point in time and link the data extracted from those signals to data extracted from the physical movement sensor signal(s) at a real point in time (e.g., 10 seconds later than the prior point in time) to determine pattern of movement to identify the vehicle driver for an elongated period of time. For example, the driver ID settings application 104 may access the storage unit 128 to retrieve data extracted from the physical movement sensor signal(s) from a prior point in time when the individual inputted a garage door open input button to open the garage door of the garage in which the vehicle 102 is parked, and may link the extracted data to extracted data captured at a real point in time when the individual opens the vehicle door to develop an elongated pattern of movement that is representative of the all of the aforementioned actions of the individual.

In some embodiments, the wearable device(s) 108 may additionally include biosignal sensors 130 that may be used to sense and determine one or more biosignal biometric parameters associated with the individual(s) wearing the respective wearable device(s) 108. The biosignal sensors 130 may sense physiological data and other data associated with the body and biological system of the individual(s) wearing the respective wearable device(s) 108. In some embodiments, the biosignal sensors may send biometric signals that include data that may be extracted by the driver ID settings application 104 that pertains to behavioral information of the individual(s) wearing the wearable device(s) 130. Such behavioral information may include but is not limited to head movements, body movements, hand postures, hand placement, body posture, individual gestures, a gait of the individual, among others.

In one or more embodiments, the biometric signals provided by the biosignal sensors 130 may be utilized by one or more driver ID settings application 104 to extract data that may be utilized in determining the driver movement pattern of the individual(s) wearing the wearable device(s) 108. More specifically, the movement pattern associated with the individual(s) may be determined based on the evaluation of the biometric signals for a requisite period of time. In additional embodiments, data extracted from the physical movement sensor signals and data extracted from the biometric signals may be processed to be fused into combined movement data that is used to determine the movement pattern associated with the individual(s).

In additional embodiments, the wearable device(s) 108 may include an HMI input/output unit 132 that may be capable of providing one or more HMI outputs to the individual(s) wearing the wearable device(s) 108. The HMI input/output unit 132 may include, but is not limited to, one or more visual devices (e.g., display screens), one or more audio devices (e.g., speakers), and/or one or more haptic devices (e.g., tactile electronic displays). The driver ID settings application 104 may utilize the HMI output unit 132 to communicate with the individual(s) wearing the wearable device(s) 108. For example, if the individual wearing the wearable device 108 is identified as the vehicle driver, the driver ID settings application 104 may utilize the visual device(s) of the HMI input/output unit 132 to output a welcome message to welcome the individual as the identified vehicle driver. In another example, the driver ID settings application 104 may utilize the visual device(s) of the HMI input/output unit 132 to output a connection establishment message to confirm the establishment of the formal connection between the wearable computing device 108 and the vehicle 102.

In one embodiment, the driver ID settings application 104 may operate the visual device(s) of the HMI input/output unit 132 to display one or more user interfaces that may be utilized by the vehicle owner to add profiles of himself/herself and one or more approved drivers of the vehicle 102. Additionally, the user interface(s) may be used by the vehicle owner or the approved driver(s) of the vehicle 102 to create a respective vehicle settings profile, link wearable device(s) 108 that are worn by the vehicle owner and/or the approved driver(s) of the vehicle 102, and/or create a learned driver movement pattern to be utilized by the driver ID settings application 104 to identify the vehicle driver, as described in more detail below.

In one or more embodiments, the individual(s) may additionally possess the portable device(s) 110. The portable device(s) 110 may include various types of handheld mobile communication devices that include, but are not limited to, a mobile device, a smart phone, a smart key fob, a tablet, an e-reader, a personal digital assistant, a video game player, a mobile navigation device, and the like. The portable device(s) 110 may include a processor 134 that may process and compute functions associated with the components of the portable device(s) 110. The portable device(s) 110 may additionally include a communication device 136 that may communicate with one or more components of the operating environment 100 and/or additional systems and components outside of the operating environment 100. For example, the communication device 136 may utilize a DSRC, Bluetooth™ connection, or Wi-Fi connection to communicate with the communication device 124 of the wearable device(s) 108 and/or the communication unit 116 of the vehicle 102.

In one or more embodiments, the portable device(s) 130 may additionally include location sensors 138. The location sensors 138 may include global positioning sensors (not shown) that may be used to provide a global location of the portable device(s) 110. As discussed below, the driver ID settings application 104 may determine locational information with respect to the portable device(s) 110 in certain situations when the pattern of movement of more than one individual wearing the wearable device(s) 108 are consistent with driver movement patterns.

The portable device(s) 110 may also include a storage unit 140 that may store one or more operating systems, applications, associated operating system data, application data, and the like that are executed by the processor 134. For example, the storage unit 140 may store application data files associated with the driver ID settings application 104 that may be executed by the processor 134.

In an exemplary embodiment, the storage unit 140 may store a device identification (device ID) that is associated with each of the one or more portable devices 110 and that is accessed and communicated by the communication device 136 of the portable device(s) 110 to the communication unit 116 of the vehicle 102 and/or the communication device 124 of the wearable device(s) 108. The device ID may be a unique identifier that may be communicated to the driver ID settings application 104 to determine the portable device(s) 110 that is associated with the respective individual(s) to formally connect the portable device 110 possessed by the identified vehicle driver to the vehicle 102. In one embodiment, the device ID may include a unique identification code that is assigned by the driver ID settings application 104 that identifies the individual(s) who is possessing the respective portable device(s) 136. In another embodiment, the device ID may include the serial number corresponding to the respective portable device(s) 136.

In one embodiment, the portable device(s) 110 may additionally include a display device (not shown) that may be utilized by the driver ID settings application 104 to display one or more user interfaces that may be utilized by the vehicle owner to add profiles of himself/herself and one or more approved drivers of the vehicle 102. Additionally, the user interface(s) may be utilized by the vehicle owner or the approved driver(s) of the vehicle 102 to create a respective vehicle settings profile, link wearable device(s) 108 and portable devices(s) 110 that are worn by/possessed by the vehicle owner and/or the approved driver(s) of the vehicle 102, and/or create the learned driver movement pattern to be utilized by the driver ID settings application 104 to identify the vehicle driver.

As described below, in one embodiment, the driver ID settings application 104 may initiate a formal connection between the portable device 110 that is possessed by the identified vehicle driver based on the identification of the vehicle driver based on a preprogrammed linking of the wearable device 108 worn by the identified vehicle driver and the portable device 110 possessed by the identified vehicle driver. The driver ID settings application 104 may update a list of established formal connections stored within one or more of the storage units 114, 128, 140 with the device ID of the wearable device 108 worn by the identified vehicle driver and the device ID of the portable device 110 possessed by the identified vehicle driver which is linked to the wearable device 108 that provided data from which the vehicle driver was identified.

II. The Driver ID Settings Application and Related Methods

The components of the driver ID settings application 104 will now be described according to an exemplary embodiment and with reference to FIG. 1. In an exemplary embodiment, the driver ID settings application 104 may be stored on one or more of the storage units 114, 128, 140 and executed by one or more of the ECU 112, the head unit 106 and/or the processors 122, 134. In an additional embodiment, the driver ID settings application 104 may be stored on the externally hosted computing infrastructure and accessed by the communication unit 116 and/or the communication devices 124, 136 and executed by one or more of the ECU 112, the head unit 106 and/or the processors 122, 134.

A general process of the execution phase of the driver ID settings application 104 will now be discussed, and will be further discussed in more detail with respect to methods discussed below. During the execution phase of the application 104, the driver ID settings application 104 may operate the communication unit 116 to detect the wearable device(s) 108 that are located within the connectable range of the vehicle 102 based on polling signals received from the wearable device(s) 108.

Upon determining the wearable device(s) 108 that are located within the connectable range of the vehicle 102, the application 104 may populate a list of the wearable device(s) 130 based on the device ID received within the polling signals as available devices. The driver ID settings application 104 may additionally receive the physical movement sensor signals provided by the wearable device(s) 108 worn by one or more individuals within the connectable range of the vehicle 102. Upon receiving the physical movement sensor signals, the application 104 may process the signals and determine one or more patterns of movement associated with the one or more individuals.

Upon determining the one or more patterns of movement associated with the one or more individuals, the driver ID settings application 104 may evaluate and compare the one or more patterns of movement associated with the one or more individuals against the one or more driver movement patterns that may include the default driver movement patterns or the learned driver movement patterns. If the driver ID settings application 104 determines that the pattern of movement of one of the one or more individuals wearing the respective wearable device(s) 108 is consistent with one of the one or more driver movement patterns, the application 104 may identify that individual as the vehicle driver.

Additionally, the driver ID settings application 104 may determine if that individual is classified as the vehicle owner or one of the one or more approved drivers of the vehicle 102 and may execute a respective vehicle settings profile associated with the individual to respectively control one or more of the plurality of vehicle systems 118. As discussed below, in some embodiments, if the driver ID settings application 104 determines that the patterns of movement of more than one individual wearing the respective wearable devices 130 is consistent with one of the one or more driver movement patterns the application 104 may utilize additional techniques to identify one of the individuals as the vehicle driver.

A setup/learning phase of the driver ID settings application 104 will now be discussed in detail. Generally, the setup/learning phase may be conducted with respect to the vehicle owner during an initial execution of the driver ID settings application 104 and/or with respect to the approved driver(s) at instances when the vehicle owner and/or the approved driver(s) would like to update the driver ID settings application 104. In an exemplary embodiment, upon the initial execution of the driver ID settings application 104, the setup/learning phase of the application 104 is initiated to setup and customize the application 104 for the vehicle 102, formally establish the vehicle owner, and one or more approved drivers of the vehicle 102. Additionally, the setup/learning phase allows the vehicle owner and/or the one or more approved drivers to link one or more wearable devices 108 to the application, link one or more portable devices 136 to the one or more wearable devices 108, and create the one or more learned driver movement patterns, among other functions.

In one embodiment, during the initial execution of the driver ID settings application 104, the vehicle owner may be presented with a setup user interface via the display device of the head unit 106, the display device of the portable device(s) 110 and/or the visual device(s) of the HMI input/output unit 132 of the wearable device(s) 108. The setup user interface allows the vehicle owner to establish himself/herself as such by creating and updating a vehicle ownership profile. The vehicle ownership profile may be populated with identifying information pertaining to the vehicle owner such as a username and password authentication that may be created for the vehicle owner to manually identify the vehicle owner with respect to the driver ID settings application 104. Additionally, the vehicle ownership profile may be populated with the vehicle owner's name, address, phone number, etc.

In some embodiments, the vehicle ownership profile may be populated with an image of the vehicle owner captured by camera(s) of the plurality of vehicle sensors 120. The vehicle ownership profile may be further populated with the device ID(s) of the wearable device(s) 108 that are worn by the vehicle owner. The setup user interface may also allow the vehicle owner to link the portable device(s) 110 possessed by the vehicle owner to the wearable device(s) 108 worn by the vehicle owner by populating the device ID(s) of the portable device(s) 110 within the vehicle ownership profile.

In an exemplary embodiment, upon completing setup of the vehicle ownership profile, the setup user interface may allow the vehicle owner to create/update a vehicle settings profile associated with the vehicle owner and link the vehicle settings profile to the vehicle owner profile. The setup user interface may allow the user to input settings with respect to one or more programmable features of one or more of the plurality of vehicle systems 118 and store those settings within the vehicle settings profile associated with the vehicle owner. For example, the vehicle owner may establish settings that include audio system options, navigation system options, seat positioning options, mirror positioning options, lighting options, door lock options, audio alerts, visual alerts, steering wheel height settings, pedal height settings, mirror placement settings, and the like. In some configurations, the vehicle owner may input a save input button to save the preferred settings within the vehicle settings profile associated with the vehicle owner.

In one or more embodiments, upon setup of the vehicle ownership profile and the vehicle settings profile associated with the vehicle owner, the driver ID settings application may store the respective profiles on one or more of the storage units 114, 128, 140 to be utilized by the driver ID settings application 104 if the vehicle owner is identified as the vehicle driver. For instance, as discussed below, during the execution phase of the application 104, if the vehicle owner is identified as the vehicle driver, the driver ID settings application 104 may access the vehicle settings profile associated with the vehicle owner and may send one or more command signals to the ECU 112 to respectively control one or more of the plurality of vehicle systems 118 to execute the vehicle owner's preferred settings as indicated within the vehicle settings profile associated with the vehicle owner.

In one or more embodiments, the vehicle owner may utilize the setup user interface to add one or more approved drivers of the vehicle 102 by creating one or more respective approved driver profiles. In some embodiments, the one or more approved drivers of the vehicle 102 may utilize the setup user interface to add additionally approved driver(s) of the vehicle 102 by creating respective approved driver profile(s). Upon creating the approved driver profile(s), the vehicle owner and/or the approved driver(s) may populate the approved driver profile(s) with identifying information pertaining to the approved driver(s) such as a username and password authentication that may be created for the approved driver(s) to manually identify each respective approved driver with respect to the driver ID settings application 104. Additionally, the approved driver profile(s) may be populated with the approved driver(s) name, address, phone number, etc.

In some embodiments, the approved driver profile(s) may be populated with an image(s) of the respective approved driver(s) of the vehicle 102 captured by camera(s) of the plurality of vehicle sensors 120. The approved driver profile(s) may be further populated with the device ID(s) of the respective wearable device(s) 108 that are worn by the approved driver(s). The setup user interface may also allow the vehicle owner and/or the approved driver(s) to link the portable device(s) 110 possessed by the approved driver(s) to the wearable device(s) 108 worn by the approved driver(s) by populating the device ID(s) of the portable device(s) 110 within the approved driver profile(s).

In an exemplary embodiment, upon completing setup of the approved driver profile(s), the setup user interface may allow the vehicle owner and/or the approved driver(s) to create/update a vehicle settings profile(s) associated with the approved driver(s) and link the vehicle settings profile(s) to the approved driver profile(s). The setup user interface may allow the user to input settings with respect to one or more programmable features of the plurality of vehicle systems 118 and store those settings within the vehicle settings profile associated with the approved driver(s).

In one or more embodiments, upon setup of the approved driver profile(s) and the vehicle settings profile(s) associated with the approved driver(s), the driver ID settings application 104 may store the respective profiles on one or more of the storage units 114, 128, 140 to be utilized by the application 104. For instance, as discussed below, during the execution phase of the application 104, if one of the one or more approved drivers is identified as the vehicle driver, the driver ID settings application 104 may access the vehicle settings profile associated with the approved driver. The driver ID settings application 104 may send one or more command signals to the ECU 112 to provide respective commands to the plurality of vehicle systems 118 to execute the approved driver's preferred settings as indicated within the vehicle settings profile associated with the approved driver.

During the execution phase of the driver ID settings application 104, one or more patterns of movement associated with one or more individuals wearing the wearable device(s) 130 may be compared to one or more driver movement patterns that may include the default driver movement patterns and/or the learned driver movement patterns. In an exemplary embodiment, the default driver movement patterns may be preprogrammed patterns (e.g., by a vehicle manufacturer) that are stored within one or more of the storage units 114, 128, 140 to be evaluated by the driver ID settings application 104.

The default driver movement patterns may include data that represents one or more movements that may be traditionally performed by the driver of the vehicle 102 prior to driving the vehicle 102. In many cases, the default driver movement patterns are consistent with one or more movements that pertain to the vehicle 102 that may include, but are not limited to, the driver's arm movements extending toward the vehicle door, the driver's finger movements that are consistent with inputting a garage door open button or a door unlock button on a key fob associated with the vehicle 102, the driver's walking movements that may be conducted after the input of the garage door open button, the driver's hand movements that are consistent with the driver clutching/pulling the door handle of the vehicle door, the driver's movements that are consistent with entering or being seated within the vehicle 102, and the like.

In one or more embodiments, during the setup/learning phase of the driver ID settings application 104, the designated vehicle owner and/or the approved driver(s) of the vehicle 102 may initiate a learning mode of the application 104 to program one or more associated learned driver movement patterns. The one or more learned driver movement patterns may be specifically programmed by the vehicle owner and/or the approved driver(s) to store patterns of movement that may be respectively utilized by the vehicle owner and/or the approved driver(s) prior to driving the vehicle 102. In other words, the vehicle owner and/or the approved driver(s) may want to store patterns of movement that may include specific actions and/or gestures that are individually conducted/provided prior to driving the vehicle 102 that may used by the application 104 to specifically identify the respective vehicle owner and/or the approved driver(s) as the vehicle driver.

In an exemplary embodiment, the vehicle owner and/or the approved driver(s) may initiate the learning mode by inputting a respective learning mode initiation user input button on the settings user interface. During the learning mode, the driver ID settings application 104 may communicate with the respective wearable device(s) 108 worn by the vehicle owner and/or the approved driver(s) who inputted the input button to receive one or more physical movement sensor signals as the vehicle owner and/or the approved driver(s) conducts actions/performs gestures that are preferred to be utilized as the learned driver movement pattern.

Upon receiving the physical movement sensor signals from the respective wearable device(s) 108, the driver ID settings application 104 may process the signals and determine the one or more patterns of movement of the respective vehicle owner and/or the approved driver(s). Upon determining the one or more patterns of movement, the application 104 may convert the one or more patterns of movement into the learned driver movement pattern and may associate the learned driver movement pattern with the respective vehicle owner and/or the approved driver(s) through their respective vehicle ownership profile and/or approved driver profile(s).

In an illustrative example, the vehicle owner may initiate the learning mode to capture one or more types of movements and gestures such as the gait of the vehicle owner walking toward the vehicle 102 and/or a hand waving gesture to be stored as the learned driver movement pattern that is specifically associated to the vehicle owner. Therefore, during the execution phase of the driver ID settings application 104, the application 104 may be able to identify the vehicle owner as the vehicle driver when the pattern of movement associated with the vehicle owner matches the learned driver movement pattern. In other words, the application 104 may identify the vehicle owner as the vehicle driver over one or more additional individuals wearing respective wearable device(s) 108 within the connectable range of the vehicle 102 based on actions and/or gestures conducted/provided by the vehicle owner that are consistent with the actions/gestures stored as the learned driver movement pattern associated with the vehicle owner.

The execution phase of the driver ID settings application 104 will now be described in more detail. During the execution phase, the application 104 may utilize associated modules that include a device detection module 142, a movement pattern determinant module 144, a driver identification module 146, and a vehicle settings execution module 148. Methods related to one or more processes that are executed by the modules 142-148 of the driver ID settings application 104 will also be described with reference to FIGS. 2-5.

Figure 2:
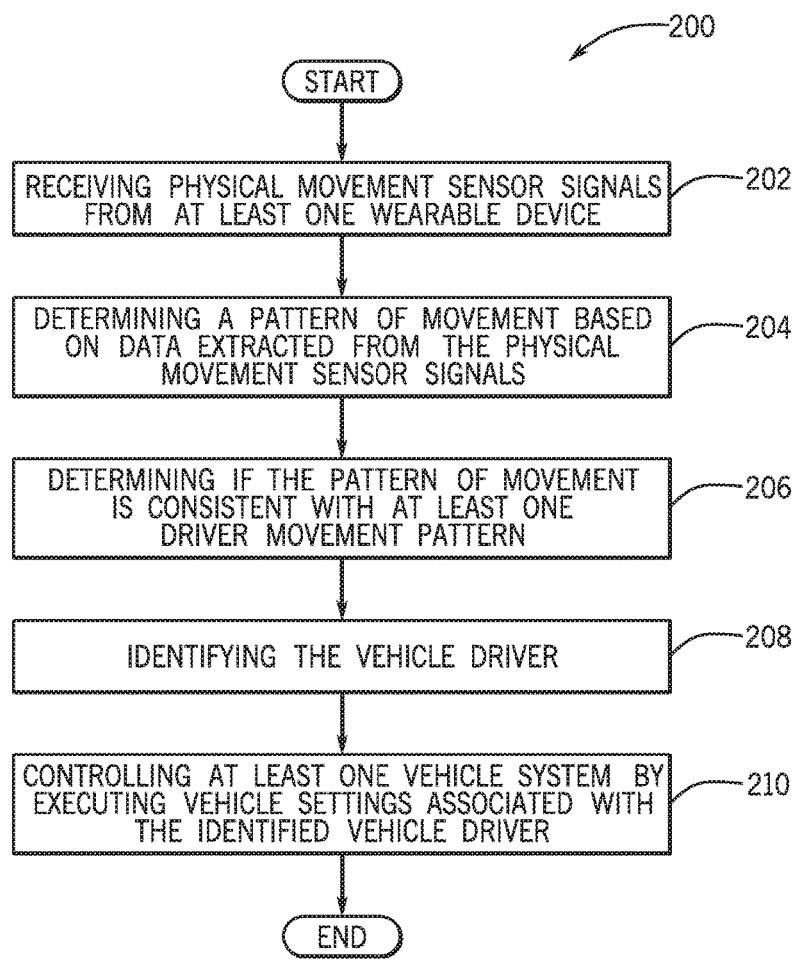
FIG. 2 is a process flow diagram of a method for identifying the vehicle driver by the pattern of movement as executed by a driver ID settings application from the operating environment of FIG. 1 according to an exemplary embodiment.

FIG. 2 is a process flow diagram of a method 200 for identifying the vehicle driver by the pattern of movement as executed by the driver ID settings application 104 from the operating environment of FIG. 1 according to an exemplary embodiment. FIG. 2 will be described with reference to the components of FIG. 1, though it is to be appreciated that the method 200 of FIG. 2 may be used with other systems/components. At block 202, the method 200 includes receiving physical movement sensor signals from at least one wearable device 108.

Figure 3:
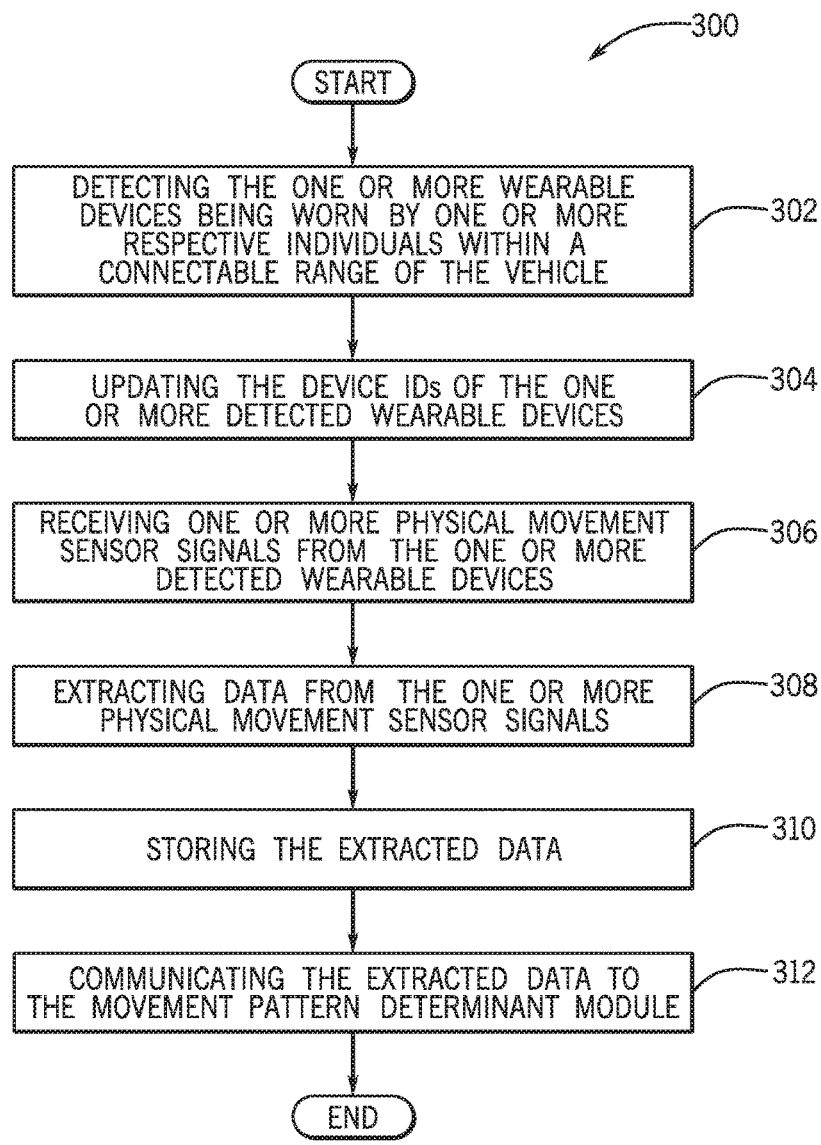
FIG. 3 is a process flow diagram of a method for receiving physical movement sensor signals from at least one wearable device from the operating environment of FIG. 1 according to an exemplary embodiment.

Referring now to FIG. 3, a process flow diagram of a method 300 for receiving physical movement sensor signals from at least one wearable device 108 from the operating environment of FIG. 1 according to an embodiment will now be discussed. FIG. 3 will be described with reference to the components of FIG. 1, though it is to be appreciated that the method 300 of FIG. 3 may be used with other systems/components.

At block 302, the method 300 may include detecting one or more wearable devices 108 being worn by one or more respective individuals within a connectable range of the vehicle 102. As described above, the communication device 124 of the wearable device(s) 108 may transmit one or more polling signals that may include the device ID of the wearable device(s) 108 and that are directed to the communication unit 116 of the vehicle 102 to indicate that the wearable device(s) 108 is located within the connectable range.

In an exemplary embodiment, upon receipt of the polling signal(s) transmitted by the communication device 124 of the wearable device(s) 108, the communication unit 116 may send a corresponding signal(s) to the device detection module 142 of the driver ID settings application 104. The device detection module 142 may detect the one or more wearable devices 108 being worn by the one or more respective individuals located within the predetermined distance of the vehicle 102 based on the receipt of the corresponding signal(s).

At block 304, the method 300 may include updating the device IDs of the one or more detected wearable devices 108. In one embodiment, upon detecting the wearable device(s) 108, the device detection module 142 may store a list of the device ID(s) of the detected wearable device(s) 108 on one or more of the storage units 114, 128, 140.

At block 306, the method 300 may include receiving one or more physical movement signals from the one or more detected wearable devices 108. In an exemplary embodiment, the physical signal sensors 126 of the detected wearable device(s) 108 may provide one or more physical movement sensor signals to the device detection module 142. As discussed above, the one or more physical movement sensor signals may be representative of one or more movements or gestures conducted/provided by the individual(s) wearing the wearable device(s) 108 as captured by the physical signal sensors 126 during a period of time. For example, the physical movement sensor signals(s) may be representative of actions sensed of the individual's arm as the individual reaches his/her arm toward the door handle of the vehicle door.

In an additional embodiment, the biosignal sensors 130 of the detected wearable device(s) 108 may provide one or more biometric signals to the device detection module 142. As discussed above, the one or more biometric signals may be representative of behavioral information of the individual(s) wearing the wearable device(s) 130 that may include body movements, hand postures, hand placement, body posture, individual gestures, the gait of the individual, head movements, and the like, as captured by the biosignal sensors 130 during a period of time.

At block 308, the method 300 includes extracting data from the one or more physical movement sensor signals. In one or more embodiments, upon receiving the physical movement sensor signal(s) from the physical signal sensors 126, the device detection module 142 may process the received physical movement sensor signal(s) and extract movement data that is associated with movement of the individual(s) wearing the wearable device(s) 108.

In an additional embodiment, upon receiving the one or more biometric signals from the biosignal sensors 130, the device detection module 142 may process the received biometric signal(s) and extract movement data that is associated with the movement of the individual(s) wearing the wearable device(s) 108. In some embodiments, if the device detection module 142 extracts data from physical movement sensor signal(s) and biometric signal(s), the device detection module 142 may further process a fusion of the extracted data from both sources into combined movement data that may be further utilized by the driver ID settings application 104, as discussed below.

At block 310, the method 300 includes storing the extracted data. In one embodiment, upon extracting the data corresponding to the physical movement sensor signals, the biometric signals, and/or processing the combined movement data, the device detection module 142 may access one or more of the storage units 114, 128, 140 and may store the data for a predetermined period of time. In some embodiments, the predetermined period of time may be a period of time between a latest occasion when the engine of the vehicle 102 was previously disabled until an occasion when the engine of the vehicle 102 is enabled. In additional embodiments, the predetermined period of time maybe a period of time between a latest occasion when the engine of the vehicle 102 was previously disabled until the occasion when the driver ID settings application 104 identifies the vehicle driver. As will be discussed below, the stored data may be accessed and evaluated to determine the pattern of movement for a requisite period of time (e.g., a period of time corresponding to a sufficient sequence of actions of the individual(s)) that is required to identify the vehicle driver.

At block 312, the method 300 includes communicating the extracted data to the movement pattern determinant module 144. In one or more embodiments, upon extracting and storing the data received from the physical movement sensor signals, the biometric signals, and/or processing the combined movement data, the device detection module 142 may send the aforementioned data to the movement pattern determinant module 144 in the form of one or more data signals to be further evaluated by the module 144.

Figure 4A:
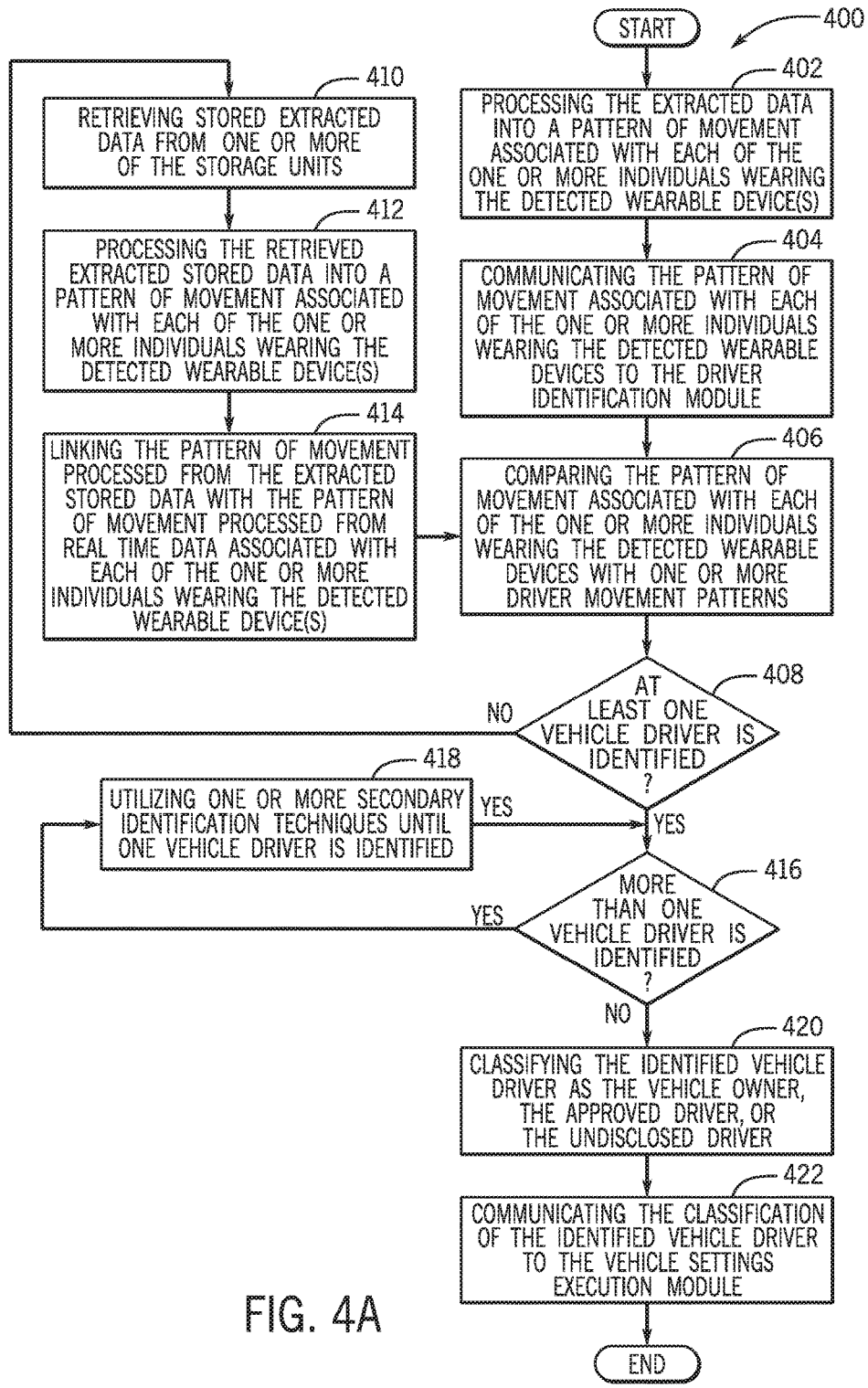
FIG. 4A is a process flow diagram of a method for determining a pattern of movement and determining if the pattern of movement is consistent with at least one driver movement pattern from the operating environment of FIG. 1 according to an exemplary embodiment.

Referring again to FIG. 2, upon receiving the physical movement sensor signals from the at least one wearable device 108 (at block 202), the method 200 may proceed to block 204. At block 204, the method 200 includes determining a pattern of movement based on data extracted from the physical movement sensor signals. Referring now to FIG. 4A, a process flow diagram of a method 400 for determining a pattern of movement and determining if the pattern of movement is consistent with at least one driver movement pattern from the operating environment of FIG. 1 according to an embodiment will now be discussed. FIG. 4A will be described with reference to the components of FIG. 1, though it is to be appreciated that the method 400 of FIG. 4A may be used with other systems/components.

At block 402, the method 400 includes processing the extracted data into a pattern of movement associated with each of the one or more individuals wearing the detected wearable device(s) 108. In an exemplary embodiment, upon receiving the one or more data signals from the device detection module 142 (as described with respect to block 312 above), the movement pattern determinant module 144 may process the data into the pattern of movement. As described above, the pattern of movement associated with the one or more individuals may include a movement, a gesture, a sequence of actions, and/or a sequence of gestures that is determined from the extracted data and/or the combined movement data and converted into the data package by the movement pattern determinant module 144. In other words, the movement pattern determinant module 144 may process the extracted data and/or the combined movement data and convert the data into the data package that is indicative of the pattern of movement of each of the one or more individuals wearing the detected wearable device(s) 108.

At block 404, the method 400 includes communicating the pattern of movement associated with each of the one or more individuals wearing the detected wearable devices 108 to the driver identification module 146. In one or more embodiments, upon processing the extracted data from the physical movement sensor signals, the biometric signals, and/or the combined movement data and converting the data into the data package that includes the pattern of movement that is associated with each of the one or more individuals, the movement pattern determinant module 144 may send the data package to the driver identification module 146 in the form of one or more data signals to be further evaluated by the module 146.

Referring again to FIG. 2, upon determining the pattern of movement based on data extracted from the physical movement sensor signals (at block 204), at block 206, the method 200 includes determining if the pattern of movement is consistent with at least one driver movement pattern. Referring again to the method 400 of FIG. 4A, at block 406, the method 400 includes comparing the pattern of movement associated with each of the one or more individuals wearing the detected wearable devices 108 with one or more driver movement patterns. In an exemplary embodiment, upon receiving the one or more data signals that are indicative of the pattern of movement of each of the one or more individuals wearing the detected wearable device(s) 108, the movement pattern determinant module 144 may evaluate the pattern(s) of movement and compare the pattern(s) of movement to the driver movement patterns.

More specifically, the driver identification module 146 may access one or more of the storage units 114, 128, 140 to retrieve the default driver movement pattern(s) that include data that represents one or more movements that may be traditionally performed by the driver of the vehicle 102 prior to driving the vehicle 102 and that may pertain to the vehicle 102 (e.g., actions and/or gestures performed by an individual that are related to opening/entering/utilizing the vehicle 102). Additionally, the driver identification module 146 may retrieve the learned driver movement pattern(s) that may have been specifically programmed by the vehicle owner and/or the approved driver(s) to store patterns of movement that may be respectively utilized by the vehicle owner and/or the approved driver(s) prior to driving the vehicle 102.

In one embodiment, the driver identification module 146 may evaluate one or more movement (data) points associated with the pattern(s) of movement of the individual(s) wearing the detected wearable device(s) 108 that are extracted from the data package that are indicative of the pattern of movement by the driver identification module 146. Upon extracting the one or more movement points the driver identification module 146 may compare the movement points associated with the pattern(s) of movement of the individual(s) to movement points programmed within and extracted from the default driver movement pattern(s) and learned driver movement pattern(s).

At block 408, the method 400 includes determining if at least one vehicle driver is identified. In one or more embodiments, upon comparing the movement points associated with the pattern(s) of movement of the individual(s) wearing the detected wearable device(s) 108 with the movement points programmed within the default driver movement pattern(s) and learned driver movement pattern(s), the driver identification module 146 may determine if there is a match between the movement points. In some embodiments, the driver identification module 146 may determine that there is a match between the movement points if the movement points are found to be similar within a certain error threshold. In an exemplary embodiment, if the driver identification module 146 determines that there is a match between the movement points, the driver identification module 146 determines that at least one vehicle driver is identified. Otherwise, if the driver identification does not determine that there is a match between the movement points, the driver identification module 146 determines that at least one vehicle driver is not identified.

If it is determined that at least one vehicle driver is not identified (at block 408), the method 400 may proceed to block 410 wherein the method 400 includes retrieving stored extracted data from one or more of the storage units 114, 128, 140. As described above with respect to block 310, upon extracting the data received from the physical movement sensor signals, the biometric signals, and/or processing the combined movement data, the device detection module 142 may access one or more of the storage units 114, 128, 140 and may store the data for a predetermined period of time.

In an exemplary embodiment, upon determining that at least one vehicle driver is not identified based on the pattern of movement associated with each of the one or more individuals wearing the detected wearable device(s) 108, the driver identification module 146 may access the storage units 114, 128, 140 to retrieve the stored extracted data that is representative of the physical movement sensor signals, biometric signals, and/or the combined movement data of each of the one or more individuals wearing the detected wearable device(s) 108. In other words, the driver identification module 146 may retrieve the extracted data regarding the movement of the individual(s) that was captured during a prior point in time (e.g., within a timeframe of 25 seconds) to be further processed.

At block 412, the method includes processing the retrieved extracted stored data into a pattern of movement associated with each of the one or more individuals wearing the detected wearable device(s) 108. In one embodiment, upon retrieving the extracted data from one or more of the storage units 114, 128, 140, the driver identification module 146 may send the retrieved extracted stored data to the movement pattern determinant module 144 in the form of one or more data signals to be further evaluated by the module 144.

Upon receiving the one or more data signals, the movement pattern determinant module 144 may process the extracted stored data into a pattern of movement associated with each of the one or more individuals wearing the wearable device(s) 108 In other words, the movement pattern determinant module 144 may process the pattern of movement of each of the individual(s) which is representative of the actions and/or gestures conducted/performed by each of the individual(s) during the prior point in time (e.g., within a timeframe of 15 seconds) when the movement of the individual(s) was captured. In one or more embodiments, the movement pattern determinant module 144 may process the extracted stored data and convert the extracted stored data into a data package that is indicative of the pattern of movement of each of the one or more individuals wearing the detected wearable device(s) 108 during the prior point in time.

At block 414, the method 400 includes linking the pattern of movement processed from the extracted stored data with the pattern of movement processed from real time data associated with each of the one or more individuals wearing the detected wearable device(s). In one embodiment, the movement pattern determinant module 144 may process a fusion and linking of the data package that is indicative of the pattern of movement processed from the extracted stored data and the data package processed from the extracted data captured in real time at block 402 into a data package that is representative of the elongated pattern of movement associated with each of the one or more individuals wearing the detected wearable device(s) 108.

The movement pattern determinant module 144 may link the aforementioned patterns of movement associated with each of the one or more individuals wearing the detected wearable device(s) to provide the elongated pattern of movement to indicate a longer sequence of actions of the individual(s) in order to provide the driver identification module 146 with an increased propensity to identify the vehicle driver. In other words, the driver identification module 146 may be able to compare a larger subset of data that represents a longer sequence of actions and/or gestures conducted/provided by the individual(s) over an elongated period of time to determine if the individual(s) are conducting actions that correspond with typical/learned driver movements represented within the one or more driver movement patterns.

Upon linking the data packages into the data package that is representative of the elongated pattern of movement, the movement pattern determinant module 144 may send the data package to the driver identification module 146 in the form of one or more data signals to be further evaluated by the module 146. The method 400 may again proceed to block 406 wherein the method 400 may include comparing the pattern of movement with one or more driver movement patterns. It is to be appreciated that the movement pattern determinant module 144 may link more patterns of movement processed from extracted stored data representative of actions/gestures of the individual(s) captured during longer periods of time as required until at least one vehicle driver is identified at block 408.

Figure 4B:
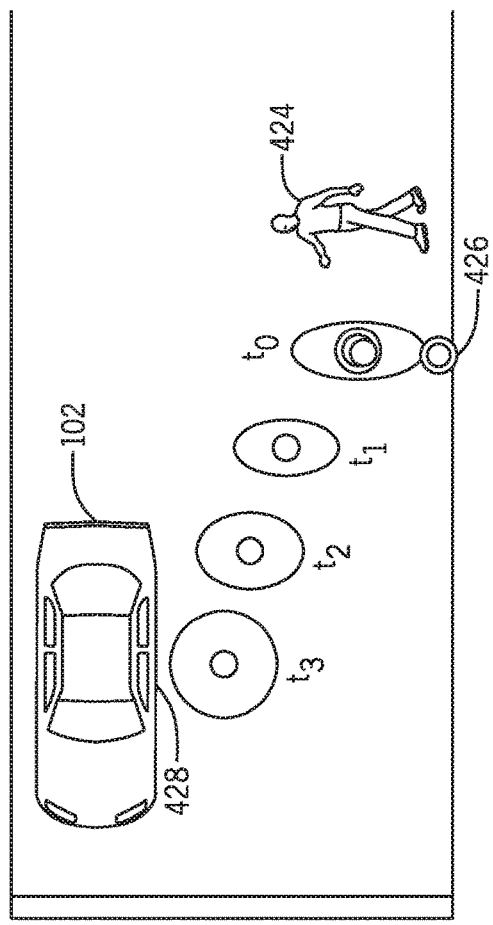
FIG. 4B is an illustrative example of linking patterns of movement, according to an exemplary embodiment.

As shown in FIG. 4B, an illustrative example of linking the patterns of movement based on block 414 of method 400, according to an exemplary embodiment, the movement pattern determinant module 144 may link the pattern of movement indicative of extracted data captured from a prior point in time to with a pattern of movement captured at a real point in time t3. In particular, the pattern of movement indicative of the prior point in time to when the individual 424 conducted actions to input a garage door open input button 426 to open a garage door of a garage in which the vehicle 102 is parked may be linked with the pattern of movement indicative of a real point in time t3 when the individual opens a vehicle door 428 to develop the elongated pattern of movement that is representative of all of the aforementioned actions of the individual. It is to be appreciated that the elongated pattern of movement may also include the movement of walking of the individual 424 and/or a gait of the individual 424 as he/she is walking towards the vehicle 102 during the periods of time $t_1$ and $t_2$.

Referring again to block 408 of the process flow diagram of FIG. 4A of the method 400, if it is determined that at least one vehicle driver is identified, at block 416, the method 400 includes determining if more than one vehicle driver is identified. In one or more embodiments, based on the comparison between the pattern of movement associated with each of the individual(s) wearing the detected wearable device(s) 108 and the driver movement pattern(s), the driver identification module 146 may determine that there is a match between the movement points associated with the pattern(s) of movement of more than one individual wearing the detected wearable device(s) 108 with the movement points programmed within the driver movement pattern(s). In other words, the driver identification module 146 may determine that more than one individual is conducting actions and/or performing gestures that are indicative of traditional and/or learned driver movements represented within the default driver movement pattern(s) and/or the learned driver movement pattern(s). For example, more than one individual may be performing actions indicative of opening a vehicle door and entering the vehicle 102 at a same point in time that may be consistent with one of the default driver movement patterns.

If it is determined that more than one vehicle driver is identified (at block 416), at block 418, the method includes utilizing one or more secondary identification techniques to identify the vehicle driver. Exemplary embodiments of the secondary identification techniques conducted by the driver identification module 146 will now be discussed. However, it is to be appreciated that various additional embodiments utilizing the components of the environment 100 may be contemplated and used to perform the secondary identification techniques. It is also appreciated that the secondary identification techniques conducted by the driver identification module 146 may be combined and/or modified.

In one embodiment, if more than one vehicle driver is identified, the driver identification module 146 may send a signal to one or more of the head unit 106 of the vehicle 102 to present a driver authentication user interface that allows the driver of the vehicle 102 to input identifying information pertaining to the vehicle owner or the approved driver of the vehicle 102 if the driver of the vehicle 102 is such. The driver authentication user interface (not shown) may additionally allow the vehicle driver who is not classified as the vehicle owner or the approved driver of the vehicle 102 to input a user interface input button that may designate him/her as the undisclosed driver of the vehicle 102. Therefore, the driver identification module 146 may identify the vehicle driver based on the data inputted by the driver of the vehicle 102 via the authentication user interface.

In an alternate embodiment, if more than one vehicle driver is identified, the driver identification module 146 may send a signal to the plurality of vehicle sensors 120 to determine data from vehicle seat sensors, steering wheel sensors, and/or gear shift sensors. The driver identification module 146 may compare the data in real time with a real time pattern of movement associated with individuals identified as vehicle drivers to determine if one of the patterns of movement match with data provided from the plurality of vehicle sensors 120. For example, the driver identification module 146 may determine a pattern of movement of an individual who is conducting actions representative of extending one of his/her hands to touch the steering wheel and/or the gear shifter that are consistent with sensor signals provided by steering wheel sensors and/or gear shift sensors to thereby identify that individual as the vehicle driver.

In an additional embodiment, if more than one vehicle driver is identified, the driver identification module 146 may send a signal to the plurality of vehicle sensors 120 to determine image data provided by one or more cameras located outside the driver's side vehicle door and/or above a driver vehicle seat within the vehicle 102 indicative of one or more real time images captured by the camera(s) of the plurality of vehicle sensors 120 of the driver of the vehicle 102. Upon receiving the image data, the driver identification module 146 may access one or more of the storage units 114, 128, 140 to access stored images of the vehicle owner and/or the approved driver(s) respectively from the vehicle ownership profile and/or the one or more approved driver profiles stored on one or more of the storage units 114, 128, 140 during the setup/learning phase of the driver ID settings application 104, as discussed above.

Upon accessing the stored images, the driver identification module 146 may utilize a camera logic to determine if there are matching features between the image data that is indicative of the real time images captured by the camera(s) and the stored images of the vehicle owner and the approved driver(s) to determine if the vehicle owner or one of the one or more approved drivers of the vehicle 102 may be identified as the vehicle driver. In some embodiments, if the driver identification module 146 does not determine a match between the image data that is indicative of the real time images and the stored images of the vehicle owner and the approved driver(s), the driver identification module 146 may identify the vehicle driver as the undisclosed driver.

In yet an additional embodiment, the driver identification module 146 may utilize the physical signal sensors 126 of the wearable device(s) 108 worn by the individuals identified as the vehicle drivers and/or the location sensors 138 of the portable device(s) 110 linked to the wearable device(s) 108 (within the vehicle ownership profile and/or the approved driver profile(s)) to determine the location of the individuals identified as the vehicle driver. In some embodiments, the driver identification may determine that the individual located at a specific location with respect to the vehicle 102 may be identified as the vehicle driver. For example, the driver identification module 146 may determine that an individual located near the driver side door of the vehicle 102 while conducting actions to open a vehicle door is to be identified as the vehicle driver rather than another individual located near the passenger side door of the vehicle 102 who is conducting similar movements.

Referring again to block 416, if it is determined that more than one vehicle driver is not identified, at block 420, the method 400 includes classifying the identified vehicle driver as the vehicle owner, the approved driver, or the undisclosed driver. In an exemplary embodiment, upon identifying one of the one or more individuals wearing the detected wearable device(s) 108 as the vehicle driver, the driver identification module 146 may access one or more of the storage units 114, 128, 140 to determine the device ID(s) of wearable devices 108 that were previously populated within the vehicle ownership profile and/or the one or more approved driver profiles stored on one or more of the storage units 114, 128, 140 during the setup/learning phase of the driver ID settings application 104, as discussed above.

In one embodiment, upon retrieving the stored device ID(s), the driver identification module 146 may compare the device ID(s) of the wearable device(s) 108 being worn by the individual identified as the vehicle driver with the device IDs that were previously populated within the vehicle ownership profile and/or the one or more approved driver profiles. If the driver identification module 146 determines that there is a match between the device ID(s) of the wearable device(s) 108 being worn by the individual and the device ID(s) populated within the vehicle ownership profile, the driver identification module 146 may classify the identified vehicle driver as the vehicle owner.

Similarly, if the driver identification module 146 determines that there is a match between the device ID(s) of the wearable device(s) 108 being worn by the individual and the device ID(s) populated within one of the one or more approved driver profiles, the driver identification module 146 may classify the identified vehicle driver as the specific approved driver of the vehicle 102 in whose profile the device ID(s) were populated. However, if the driver identification module 146 determines that there is no match between the device ID(s) of the wearable device(s) 108 being worn by the individual and the device ID(s) populated within either of the vehicle ownership profile and/or the one or more approved driver profiles, the driver identification module 146 may classify the identified vehicle driver as the undisclosed driver.

In other embodiments, the vehicle settings execution module 148 may classify the identified vehicle driver as the vehicle owner, the approved driver, or the undisclosed driver based on the identification techniques utilized to identify the vehicle driver, discussed above with respect to block 418. In some embodiments, the vehicle settings execution module 148 may utilize the techniques discussed above with respect to block 418 in conjunction with the embodiments discussed above with respect to block 420 to classify the identified vehicle driver.

At block 422, the method includes communicating the classification of the identified vehicle driver to the vehicle settings execution module 148. In one or more embodiments, upon classifying the identified vehicle driver, the driver identification module 146 may send data representing the identified vehicle driver, the classification of the identified vehicle driver, and the device ID(s) of the wearable device(s) 108 worn by the identified vehicle driver to the vehicle settings execution module 148 in the form of one or more data signals to be further evaluated by the module 148.

Figure 5:
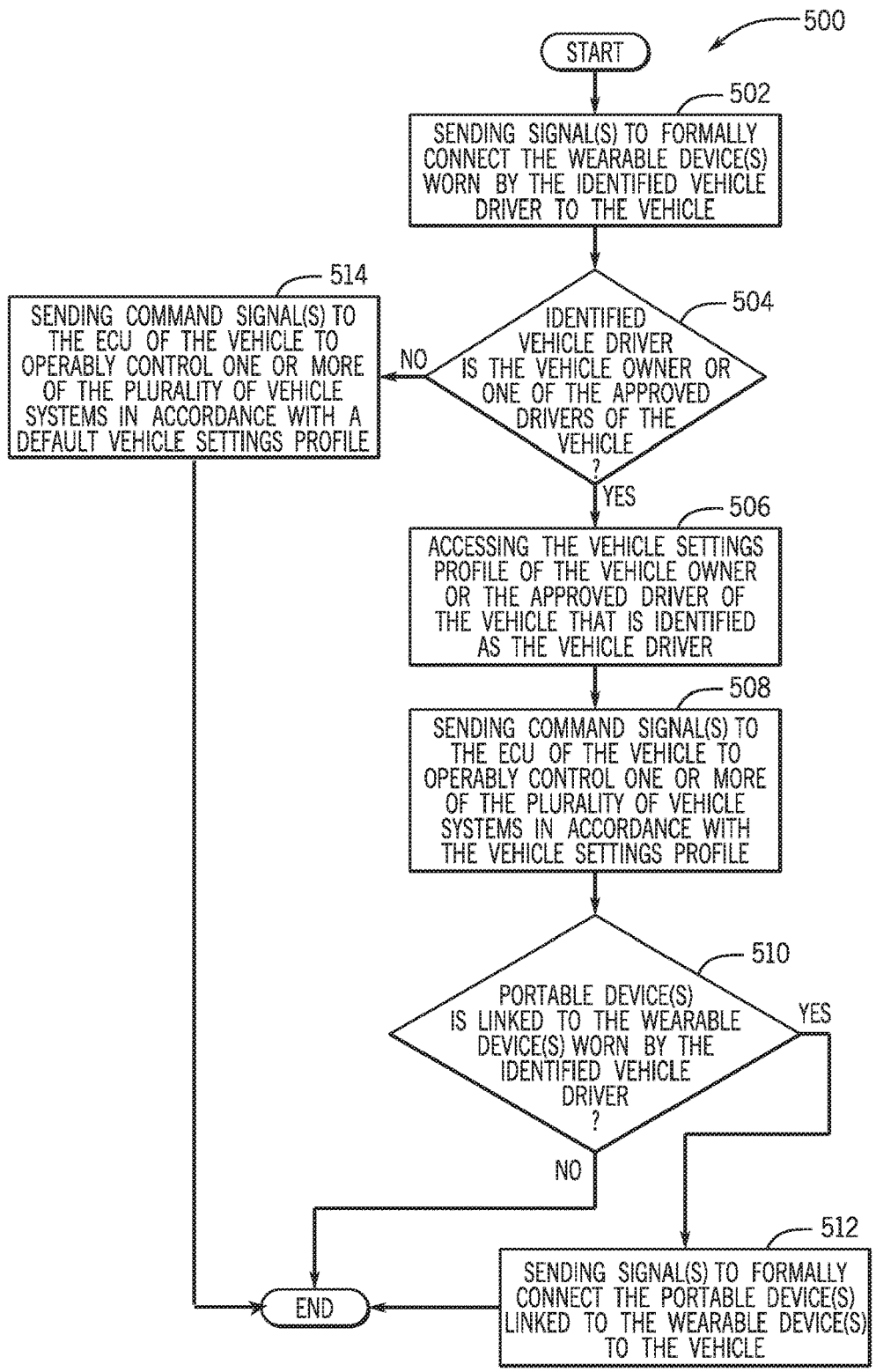
FIG. 5 is a process flow diagram of a method for controlling at least one vehicle system from the operating environment of FIG. 1 according to an exemplary embodiment.

Referring again to FIG. 2, upon identifying the vehicle driver (at block 208), at block 210, the method 200 includes controlling at least one vehicle system by executing vehicle settings associated with the identified vehicle driver. Referring now to FIG. 5, a process flow diagram of a method 500 for controlling at least one vehicle system from the operating environment of FIG. 1 according to an embodiment will now be discussed. FIG. 5 will be described with reference to the components of FIG. 1, though it is to be appreciated that the method 500 of FIG. 5 may be used with other systems/components.

At block 502, the method 500 includes sending signal(s) to formally connect the wearable device(s) 108 worn by the identified vehicle driver to the vehicle 102. In an exemplary embodiment, upon receiving the one or more data signals representing the identified vehicle driver, the classification of the identified vehicle driver and the wearable device(s) 108 worn by the identified vehicle driver, the vehicle settings execution module 148 may send one or more command signals to the communication unit 116 to formally connect the wearable device(s) 108 worn by the identified vehicle driver to the vehicle 102. More specifically, the vehicle settings execution module 148 may allow the wearable device(s) 108 worn by the identified vehicle driver to be formally connected via the DSRC, the Bluetooth™ connection, the Wi-Fi connection, and the like. As discussed above, the vehicle settings execution module 148 may update the list of established formal connections with the device ID(s) of the wearable device(s) 108 worn by the identified vehicle driver.

In one or more embodiments, the vehicle settings execution module 148 may also send one or more command signals to the communication unit 116 of the vehicle 102 to disallow a formal connection(s) with the detected wearable device(s) 108 that are worn by individual(s) that are not identified as the vehicle driver. Therefore, detected wearable device(s) 108 worn by individual(s) conducting actions and/or performing gestures that are within the vicinity of the vehicle 102 whose wearable devices 108 were detected (at block 302 of FIG. 3), may not be automatically formally connected to the vehicle 102.

At block 504, the method includes determining if the identified vehicle driver is the vehicle owner or one of the approved drivers of the vehicle 102. As discussed above with respect to block 442 of the method 400, the driver identification module 146 may communicate one or more data signals that may represent the classification of the identified vehicle driver determined at block 440 of the method 400. In one embodiment, the vehicle settings execution module 148 may evaluate the data signals received from the driver identification module 146 and may determine if the classification of the identified vehicle driver is the vehicle owner or the approved driver of the vehicle 102.

If it is determined that the identified vehicle driver is the vehicle owner or one of the approved drivers of the vehicle 102 (at block 504), at block 506, the method 500 includes accessing the vehicle settings profile of the vehicle owner or the approved driver of the vehicle 102 identified as the vehicle driver. As discussed above, during the setup/learning phase of the driver ID settings application 104, the setup user interface may allow the vehicle owner and/or the approved driver(s) of the vehicle 102 to create/update a vehicle settings profile that may be linked to the vehicle ownership profile associated with the vehicle owner or the approved driver profile associated with the respective approved driver.

In an exemplary embodiment, the driver identification module 146 may determine the vehicle owner or the specific approved driver of the vehicle 102 is the identified vehicle driver based on the evaluation of the one or more data signals that may represent the identified vehicle driver received from the driver identification module 146. If the vehicle owner is determined to be the identified vehicle driver at block 504, the vehicle settings execution module 148 may access the vehicle settings profile linked to the vehicle ownership profile and associated with the vehicle owner. On the other hand, if the specific approved driver of the vehicle 102 is identified as the vehicle driver at block 504, the vehicle settings execution module 148 may access the vehicle settings profile linked to the approved driver profile and associated with the specific approved driver of the vehicle 102.

At block 508, the method 500 includes sending command signal(s) to the ECU 112 of the vehicle 102 to operably control one or more of the plurality of vehicle systems 118 in accordance with the vehicle settings profile. In an exemplary embodiment, upon accessing the vehicle settings profile at block 506, the vehicle settings execution module 148 may send one or more command signals to the ECU 112 of the vehicle 102 to control one or more of the plurality of vehicle systems 118 in accordance with the identified vehicle driver's preferences detailed within the vehicle settings profile.

The ECU 112 may receive one or more command signals from the vehicle settings execution module 148 to operably control one or more of the plurality of vehicle systems 118 in accordance with a vehicle settings profile. Consequently, one or more of the plurality of vehicle systems 118 may adjust respective settings in accordance with the identified vehicle driver's preferences. In some cases, the adjustment of the respective settings may be completed by one or more of the plurality of vehicle systems 118 before the identified vehicle driver enters the vehicle 102 and/or enables the engine of the vehicle 102 such that the identified vehicle driver does not have to wait for the settings to be executed prior to entering the vehicle 102 and/or enabling the engine of the vehicle 102.

At block 510, the method 500 may include determining if portable device(s) 110 is linked to the wearable device(s) 108 worn by the identified vehicle driver. As discussed above, during the setup/learning phase of the driver ID settings application 104, the vehicle owner and/or the approved driver(s) of the vehicle 102 may link the portable device(s) 110 possessed by the vehicle owner or the approved driver(s) of the vehicle 102 to the wearable device(s) 108 worn by the vehicle owner or approved driver(s). In particular, the setup user interface may allow the vehicle owner and/or the approved driver(s) of the vehicle 102 to populate the device ID(s) of the portable device(s) 110 within the vehicle ownership profile or the approved driver profile(s).

In one embodiment, if the vehicle owner is determined to be the identified vehicle driver at block 504, the vehicle settings execution module 148 may access the vehicle ownership profile and determine if the device ID(s) of the portable device(s) 110 is linked to the wearable device(s) 108 populated within the vehicle ownership profile to determine that portable device(s) 110 is linked to the wearable device(s) 108 worn by the vehicle owner determined to be the identified vehicle driver. If one of the one or more approved drivers of the vehicle 102 is determined to be the identified vehicle driver, at block 504, the vehicle settings execution module 148 may access the respective approved driver profile and determine if the device ID(s) of the portable device(s) 110 is populated within the respective approved driver profile to determine that the portable device(s) 110 is linked to the wearable device(s) 108 worn by the specific approved driver of the vehicle 102 determined to be the identified vehicle driver.

At block 512, the method 500 includes sending signal(s) to formally connect the portable device(s) 110 linked to the wearable device(s) 108 to the vehicle 102. In one embodiment, if the vehicle owner is determined to be the identified vehicle driver at block 504, the vehicle settings execution module 148 may access the vehicle ownership profile and determine the device ID(s) of the portable device(s) 110 linked to the wearable device(s) 108 worn by the vehicle owner. On the other hand, if the specific approved driver of the vehicle 102 is identified as the vehicle driver at block 504, the vehicle settings execution module 148 may access the approved driver profile and determine the device ID(s) of the portable device(s) 110 linked to the wearable device(s) 108 worn by the specific approved driver of the vehicle 102.

In an exemplary embodiment, upon determining the device ID(s) of the portable device(s) 110 linked to the wearable device(s) 108 worn by the identified vehicle driver, the vehicle settings execution module 148 may send one or more command signals to the communication unit 116 to formally connect the portable device(s) 110 linked to the wearable device(s) 108 and possessed by the identified vehicle driver to the vehicle 102. More specifically, the vehicle settings execution module 148 may allow the portable device(s) 110 to be formally connected via the DSRC, the Bluetooth™ connection, the Wi-Fi connection, and the like. As discussed above, the vehicle settings execution module 148 may update the list of established formal connections with the device ID(s) of the portable devices(s) 110 linked to the wearable device(s) 108 worn by the identified vehicle driver.

Referring again to block 504, if it is determined that the identified vehicle driver is not the vehicle owner or one of the approved drivers of the vehicle 102, the method 500 may proceed to block 514, wherein the method 500 includes sending command signal(s) to the ECU 112 of the vehicle 102 to operably control one or more of the plurality of vehicle systems in accordance with a default vehicle settings profile. In one embodiment, if the vehicle settings execution module 148 determines that the identified vehicle driver is not the vehicle owner and/or one of the one or more approved drivers of the vehicle 102, the module 148 may identify the vehicle driver as the undisclosed driver and may send one or more command signals to the ECU 112 of the vehicle 102 to control one or more of the plurality of vehicle systems 118 to provide default settings to the identified vehicle driver in accordance with the default vehicle settings profile.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for identifying a vehicle driver by a pattern of movement, comprising:
receiving sensor signals from at least one wearable device;
determining the pattern of movement based on data extracted from the sensor signals, wherein the extracted data represents physical movement and biosignal biometric parameters that are fused into combined movement data, wherein the combined movement data is converted into a data package that is indicative of the pattern of movement with respect to at least one movement of the vehicle driver that pertains to the vehicle;
evaluating at least one data point that is extracted from the data package to determine if it is consistent with at least one data point programmed within and extracted from at least one predetermined driver movement pattern;
identifying the vehicle driver based on the at least one data point being consistent with the at least one predetermined driver movement pattern;
executing a vehicle settings profile associated with the identified vehicle driver; and
controlling at least one vehicle system of the vehicle, wherein the at least one vehicle system is controlled based on the execution of the vehicle settings profile associated with the identified vehicle driver.

2. The computer-implemented method of claim 1, wherein the sensor signals received from the at least one wearable device includes at least one physical movement sensor signal that includes data representative of at least one movement or gesture that occurs outside of the vehicle that is sensed during a period of time.

3. The computer-implemented method of claim 2, wherein determining the pattern of movement includes processing data from data extracted from the at least one physical movement sensor signal.

4. The computer-implemented method of claim 1, wherein the at least one predetermined driver movement pattern includes at least one of: a default driver movement pattern and a learned driver movement pattern, wherein the default driver movement pattern includes preprogrammed data that represents at least one movement that may be performed by the vehicle driver outside of the vehicle, wherein the learned driver movement pattern is based on at least one movement or gesture that occurs outside of the vehicle and is created by at least one of: a vehicle owner, and at least one approved driver of the vehicle.

5. The computer-implemented method of claim 4, wherein the evaluating step to determine if it is consistent with at least one predetermined driver movement pattern includes evaluating and comparing the pattern of movement against the default driver movement pattern and the learned driver movement pattern, wherein the default driver movement pattern and the learned driver movement pattern include at least one of: a movement, the sequence of actions, a gesture, and a sequence of gestures traditionally conducted by a driver prior to entering the vehicle.

6. The computer-implemented method of claim 5, wherein the evaluating step to determine if it is consistent with at least one predetermined driver movement pattern includes extracting at least one movement point from the data package that includes data that is indicative of the pattern of movement and comparing the at least one movement point extracted from the data package to at least one movement point extracted from the default driver movement pattern and the learned driver movement pattern.

7. The computer-implemented method of claim 6, wherein the evaluating step to determine if it is consistent with at least one predetermined driver movement pattern includes determining that there is a match between the at least one movement point extracted from the data package that includes the data that is indicative of the pattern of movement and the movement point extracted from the default driver movement pattern and the learned driver movement pattern.

8. The computer-implemented method of claim 7, wherein identifying the vehicle driver includes determining if a device ID of the wearable device that provided at least one sensor signal associated with the pattern of movement that is consistent with the at least one predetermined driver movement pattern is stored within a profile that is associated with at least one of: the vehicle owner, and the at least one approved driver of the vehicle.

9. The computer-implemented method of claim 8, wherein controlling at least one vehicle system includes at least one of: accessing and executing settings from a vehicle settings profile linked with the profile that is associated with the vehicle owner when the identified vehicle driver is determined to be the vehicle owner, and accessing and executing settings from a vehicle settings profile linked with the profile that is associated with the at least one approved driver of the vehicle when the identified vehicle driver is determined to be the at least one approved driver of the vehicle.

10. A system for identifying a vehicle driver by a pattern of movement, comprising:
a memory storing instructions when executed by a processor cause the processor to:
receive sensor signals from at least one wearable device;
determine the pattern of movement based on data extracted from the sensor signals, wherein the extracted data represents physical movement and biosignal biometric parameters that are fused into combined movement data, wherein the combined movement data is converted into a data package that is indicative of the pattern of movement with respect to at least one movement of the vehicle driver that pertains to the vehicle;
evaluate at least one data point that is extracted from the data package to determine if it is consistent with at least one data point programmed within and extracted from at least one predetermined driver movement pattern;
identify the vehicle driver based on the at least one data point being consistent with the at least one predetermined driver movement pattern;
execute a vehicle settings profile associated with the identified vehicle driver; and
control at least one vehicle system of the vehicle, wherein the at least one vehicle system is controlled based on the execution of the vehicle settings profile associated with the identified vehicle driver.

11. The system of claim 10, wherein the sensor signals received from the at least one wearable device includes at least one physical movement sensor signal that includes data representative of at least one movement or gesture that occurs outside of the vehicle that is sensed during a period of time.

12. The system of claim 11, wherein determining the pattern of movement includes processing data from at least one of: data extracted from the at least one physical movement sensor signal.

13. The system of claim 10, wherein the at least one predetermined driver movement pattern includes at least one of: a default driver movement pattern and a learned driver movement pattern, wherein the default driver movement pattern includes preprogrammed data that represents at least one movement that may be performed by the vehicle driver outside of the vehicle, wherein the learned driver movement pattern is based on at least one movement or gesture that occurs outside of the vehicle and is created by at least one of: a vehicle owner, and at least one approved driver of the vehicle.

14. The system of claim 13, wherein the evaluating step to determine if it is consistent with at least one predetermined driver movement pattern includes evaluating and comparing the pattern of movement against the default driver movement pattern and the learned driver movement pattern, wherein the default driver movement pattern and the learned driver movement pattern include at least one of: a movement, the sequence of actions, a gesture, and a sequence of gestures traditionally conducted by a driver prior to entering the vehicle.

15. The system of claim 14, wherein the evaluating step to determine if it is consistent with at least one predetermined driver movement pattern includes extracting at least one movement point from the data package that includes data that is indicative of the pattern of movement and comparing the at least one movement point extracted from the data package to at least one movement point extracted from the default driver movement pattern and the learned driver movement pattern.

16. The system of claim of claim 15, wherein the evaluating step to determine if it is consistent with at least one driver movement pattern includes determining that there is a match between the at least one movement point extracted from the data package that includes the data that is indicative of the pattern of movement and the movement point extracted from the default driver movement pattern and the learned driver movement pattern.

17. The system of claim 16, wherein identifying the vehicle driver includes determining if a device ID of the wearable device that provided at least one sensor signal associated with the pattern of movement that is consistent with the at least one predetermined driver movement pattern is stored within a profile that is associated with at least one of: the vehicle owner, and the at least one approved driver of the vehicle.

18. The system of claim 17, wherein controlling at least one vehicle system includes at least one of: accessing and executing settings from a vehicle settings profile linked with the profile that is associated with the vehicle owner when the identified vehicle driver is determined to be the vehicle owner, and accessing and executing settings from a vehicle settings profile linked with the profile that is associated with the at least one approved driver of the vehicle when the identified vehicle driver is determined to be the at least one approved driver of the vehicle.

19. A non-transitory computer readable storage medium storing instructions that when executed by a computer, which includes a processor perform a method, the method comprising:
receiving sensor signals from at least one wearable device;
determining a pattern of movement based on data extracted from the sensor signals, wherein the extracted data represents physical movement and biosignal biometric parameters that are fused into combined movement data, wherein the combined movement data is converted into a data package that is indicative of the pattern of movement with respect to at least one movement of the vehicle driver that pertains to the vehicle;

evaluating at least one data point that is extracted from the data package to determine if it is consistent with at least one data point programmed within and extracted from at least one predetermined driver movement pattern;

identifying the vehicle driver based on the at least one data point being consistent with the at least one predetermined driver movement pattern;

executing a vehicle settings profile associated with the identified vehicle driver; and controlling at least one vehicle system of the vehicle, wherein the at least one vehicle system is controlled based on the execution of the vehicle settings profile associated with the identified vehicle driver.

20. The non-transitory computer readable storage medium of claim 19, wherein the evaluating step to determine if it is consistent with at least one predetermined driver movement pattern includes extracting at least one movement point from a data package that includes data that is indicative of the pattern of movement and evaluating the at least one movement point associated with the pattern of movement and comparing the at least one movement point extracted from the data package to at least one movement point extracted from the at least one predetermined driver movement pattern.

* * * * *